(12) United States Patent
Zhao et al.

(10) Patent No.: US 10,261,314 B2
(45) Date of Patent: Apr. 16, 2019

(54) HEAD-UP DISPLAY

(71) Applicant: Johnson Controls GmbH, Burscheid (DE)

(72) Inventors: Yanning Zhao, Monheim am Rhein (DE); Frank Schliep, Leverkusen (DE)

(73) Assignee: Johnson Controls GMBH, Burscheid (DE)

( * ) Notice: Subject to any disclaimer, the term of this patent is extended or adjusted under 35 U.S.C. 154(b) by 64 days.

(21) Appl. No.: 14/419,420

(22) PCT Filed: Aug. 2, 2013

(86) PCT No.: PCT/EP2013/066278
§ 371 (c)(1),
(2) Date: Feb. 3, 2015

(87) PCT Pub. No.: WO2014/023658
PCT Pub. Date: Feb. 13, 2014

(65) Prior Publication Data
US 2015/0219894 A1    Aug. 6, 2015

(30) Foreign Application Priority Data

Aug. 4, 2012   (DE) .................. 10 2012 015 502

(51) Int. Cl.
*G02B 27/14* (2006.01)
*G02B 27/01* (2006.01)
*G02B 5/20* (2006.01)

(52) U.S. Cl.
CPC ........... *G02B 27/0101* (2013.01); *G02B 5/20* (2013.01); *G02B 27/14* (2013.01); *G02B 2027/0118* (2013.01); *G02B 2027/0145* (2013.01)

(58) Field of Classification Search
CPC .... G02B 2027/0172; G02B 2027/0178; G02B 27/017; G02B 27/0101; G02B 27/701;
(Continued)

(56) References Cited

U.S. PATENT DOCUMENTS

| 4,832,427 | A | 5/1989 | Nanba et al. |
| 4,880,287 | A | 11/1989 | Moss |

(Continued)

FOREIGN PATENT DOCUMENTS

| DE | 1006375 B | 4/1957 |
| DE | 19930710 A1 | 1/2001 |

(Continued)

OTHER PUBLICATIONS

Petrov, V., Chamrai, A.V., Petter, J., Tchudi, T., Petrov, M.P., Tunable optical filters based on photorefractive holographic gratingsProc. SPIE 5135, Optical Information, Data Processing and Storage, and Laser Communication Technologies, (Sep. 3, 2003), https://doi.org/10.1117/12.518129, pp. 123-129.*

(Continued)

*Primary Examiner* — William R Alexander
*Assistant Examiner* — Tamara Y. Washington
(74) *Attorney, Agent, or Firm* — Quinn IP Law

(57) ABSTRACT

A head-up display, in particular for use in a vehicle, includes a light source and a projection screen. An intermediate screen is provided for the orientation of light emitted from a light source and, resulting therefrom, for the shaping of an image to be displayed on the projection screen. The intermediate screen is at least partially reflective.

6 Claims, 3 Drawing Sheets

Figure 1:
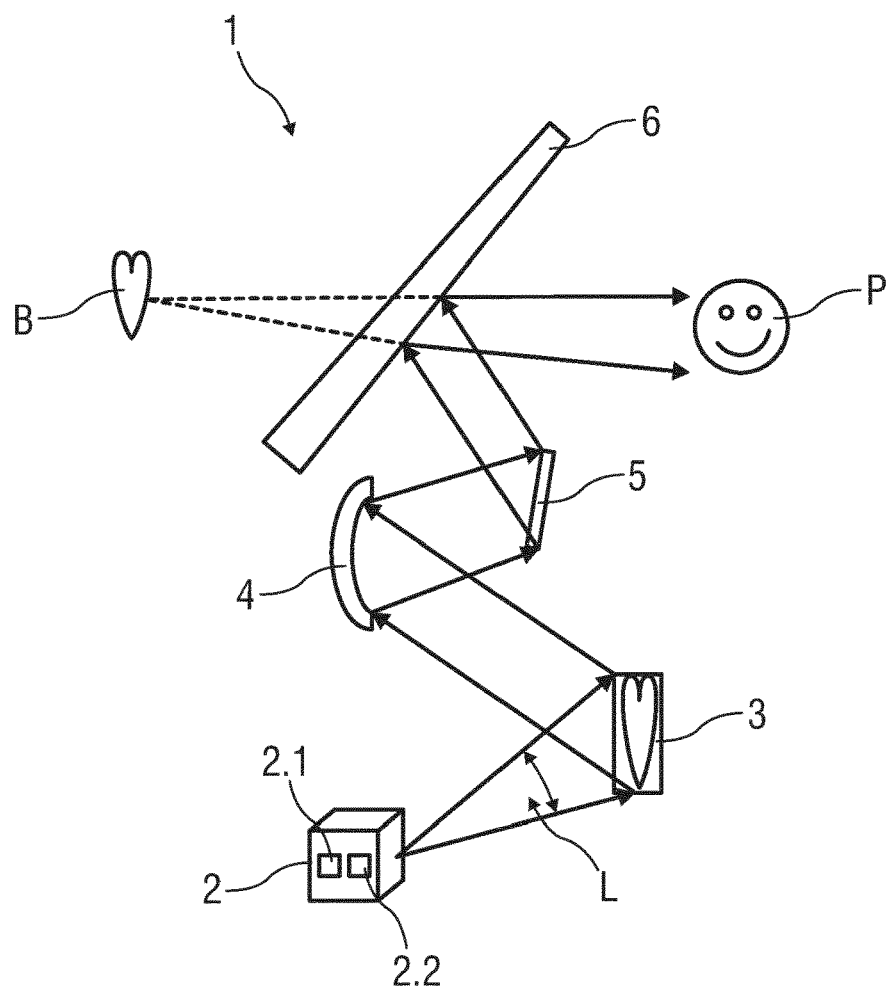

(58) Field of Classification Search
CPC ............ G02B 19/0014; G02B 19/0057; G02B 27/0944; H01S 3/0057; H01S 3/08009; H01S 3/08013; H01S 3/109; H01S 5/141; H01S 5/4062; H01S 5/08031; H01S 5/005; H01S 5/0654; H01S 5/065; H01S 5/143; H01S 5/405; H01S 5/4012; H01S 5/4068; H01S 5/4087
USPC .................................................. 359/630–640
See application file for complete search history.

(56) References Cited

U.S. PATENT DOCUMENTS

| | | | | |
|---|---|---|---|---|
| 5,535,024 | A * | 7/1996 | Khoury | G03H 1/0248 359/1 |
| 7,203,005 | B2 * | 4/2007 | Jiang | G02B 27/283 345/7 |
| 7,733,571 | B1 | 6/2010 | Li | |
| 9,748,730 | B2 * | 8/2017 | Volodin | H01S 3/1305 |
| 9,793,674 | B2 * | 10/2017 | Volodin | H01S 3/0057 |
| 2004/0100420 | A1 | 5/2004 | Piehler | |
| 2009/0086604 | A1 * | 4/2009 | Usami | G11B 7/00781 369/103 |
| 2010/0096603 | A1 * | 4/2010 | Wang | C09K 15/16 252/587 |
| 2011/0175798 | A1 | 7/2011 | Sato et al. | |
| 2012/0058418 | A1 * | 3/2012 | Wang | G03H 1/02 430/2 |
| 2012/0250119 | A1 * | 10/2012 | Takemori | G03H 1/0236 359/3 |
| 2013/0194651 | A1 * | 8/2013 | Srivastava | G02F 1/01 359/279 |

FOREIGN PATENT DOCUMENTS

| | | |
|---|---|---|
| DE | 10344688 A1 | 5/2005 |
| DE | 10 2006 013 140 A1 | 9/2007 |
| DE | 102007007162 A1 | 8/2008 |
| EP | 1 619 533 A1 | 1/2006 |
| EP | 2 045 647 A1 | 4/2009 |
| GB | 2 301 199 A | 11/1996 |
| JP | 2005-082103 A | 3/2005 |
| JP | 2009-163122 A | 7/2009 |
| JP | 2010-164941 A | 7/2010 |
| JP | 2011-166396 A | 8/2011 |
| JP | 2011-180541 A | 9/2011 |
| WO | WO-01/09709 A1 | 2/2001 |

OTHER PUBLICATIONS

International Search Report in PCT/EP2013/066278 dated Apr. 24, 2014, 3 pages.
Office Action dated Feb. 2, 2016, in corresponding Japanese application No. 2015-524802 and English translation, 9 pages.
Office Action dated Apr. 5, 2016, in corresponding Chinese application No. 2013800412486 and English translation, 13 pages.
DE Office Action dated Nov. 16, 2018 for application No. 112013003876.5.

* cited by examiner

HEAD-UP DISPLAY

CROSS REFERENCE TO RELATED APPLICATIONS

The present application is a U.S. National Stage of International Application No. PC/EP2013/066278 filed on Aug. 2, 2013, which claims the benefit of German Patent Application No. 10 2012 015 502.6 filed on Aug. 4, 2012, the entire disclosures of all of which are incorporated herein by reference.

The invention relates to a head-up display, in particular for use in a vehicle, comprising a light source and a projection screen, wherein provision is made of an intermediate screen for the orientation of light emitted by a light source and, resulting therefrom, for the shaping of an image to be represented on the projection screen.

The prior art discloses display devices, designated generally as so-called head-up displays for automotive applications. Head-up displays are used to extend a display of information from instruments arranged in a dashboard of the vehicle into a region of a windshield of the vehicle by means of a virtual image being output to a driver of the vehicle in said region. In this case, these virtual images are output at a specific distance from the eyes of the observer, wherein the distance is chosen in such a way as to reduce the refocusing of the eyes when the gaze changes from looking at the display of the information to external surroundings of the vehicle. Such a representation of the information by means of the head-up display reduces the observer's effort required for registering the information, and enables a graphic representation conforming to the surroundings of the vehicle. Such head-up display comprise an intermediate screen, onto which the information to be displayed is projected. The intermediate screen is embodied in a transparent fashion and provided for the orientation of light emitted by a light source. The light transmitted through the intermediate screen is represented as an image to be displayed by means of a projection screen. The projection screen is embodied as a separate screen or is formed by a windshield or a region thereof, which region is designated as a combiner and is embodied as partly transparent and partly refractive.

WO 2001/009709 A1 discloses a head-up display comprising a light source and a display for generating images, wherein said images are projected into a user's field of view by an optical system. The optical system comprises a diffractive combiner for introducing computer generated holograms. The light source and the display are controllable by means of an electronic control circuit. The light source unit comprises, in a manner arranged successively in the direction of the light beam, a non-coherent light generator, a device for increasing the coherence and a beam shaping unit for scattering the light coming from the device for increasing the coherence on the rear side of the display.

It is an object of the present invention to specify an improved head-up display compared with the prior art.

The object is achieved according to the invention by means of a head-up display having the features specified in claim 1.

The dependent claims relate to advantageous configurations of the invention.

The head-up display comprises a light source and a projection screen, wherein provision is made of an intermediate screen for the orientation of light emitted by a light source and, resulting therefrom, for the shaping of an image to be represented on the projection screen.

According to the invention, the intermediate screen is embodied in an at least partly reflective fashion.

This results, particularly advantageously, in the minimization of backlighting of the image to be represented, said backlighting resulting from ambient light. This minimization has the consequence in turn that, likewise particularly advantageously, illumination of the image to be represented with ambient light is minimized, and, as a consequence thereof, a contrast of the image to be represented is increased. What is furthermore is achieved as a result is that a representation of the image in which the latter is superimposed on the surroundings visible through a windshield of a vehicle is realizable particularly realistically.

In accordance with one possible configuration, the intermediate screen is embodied in a fully reflective fashion, as a result of which the backlighting of the image with ambient light is minimized particularly simply, such that a high contrast of the image is realizable.

In one development, the intermediate screen comprises an optical filter, such that a further reduction of an influence of the ambient light on the virtual image is achievable.

In order to attain this reduction particularly efficiently, in accordance with one development the optical filter is embodied in such a way that exclusively the light generated by the light source is reflectable from the intermediate screen.

In one development, the optical filter for reducing the influence of the ambient light on the virtual image is embodied in such a way that ambient light is absorbable, transmittable or reflectable in a predefined direction.

In accordance with one possible further configuration, the intermediate screen is embodied in a partly reflective fashion in such a way as to minimize the backlighting of the image to be represented, which backlighting results from ambient light.

In one possible development, the intermediate screen comprises an optical filter for this purpose, which optical filter, in accordance with a further configuration, is embodied in such a way that exclusively the light generated by the light source is transmittable by the intermediate screen, and which optical filter, in accordance with a further configuration, is embodied in such a way that ambient light is reflectable, absorbable or deflectable in a predefined direction.

In accordance with one configuration, the projection screen also comprises an optical filter embodied in such a way that exclusively the light generated by the light source is reflectable from the projection screen in the direction of an observer and ambient light is absorbable, transmittable or reflectable in a predefined different direction. Consequently the influence of the ambient light is further reduced significantly.

Exemplary embodiments of the invention are explained in greater detail below with reference to drawings.

Figure 2:
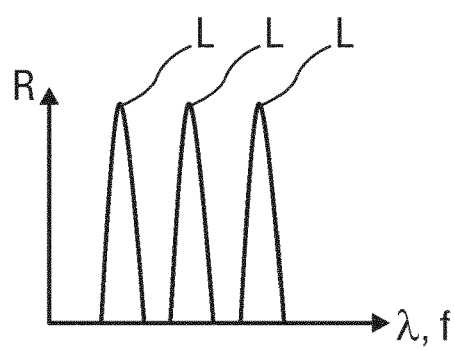
Figure 3:
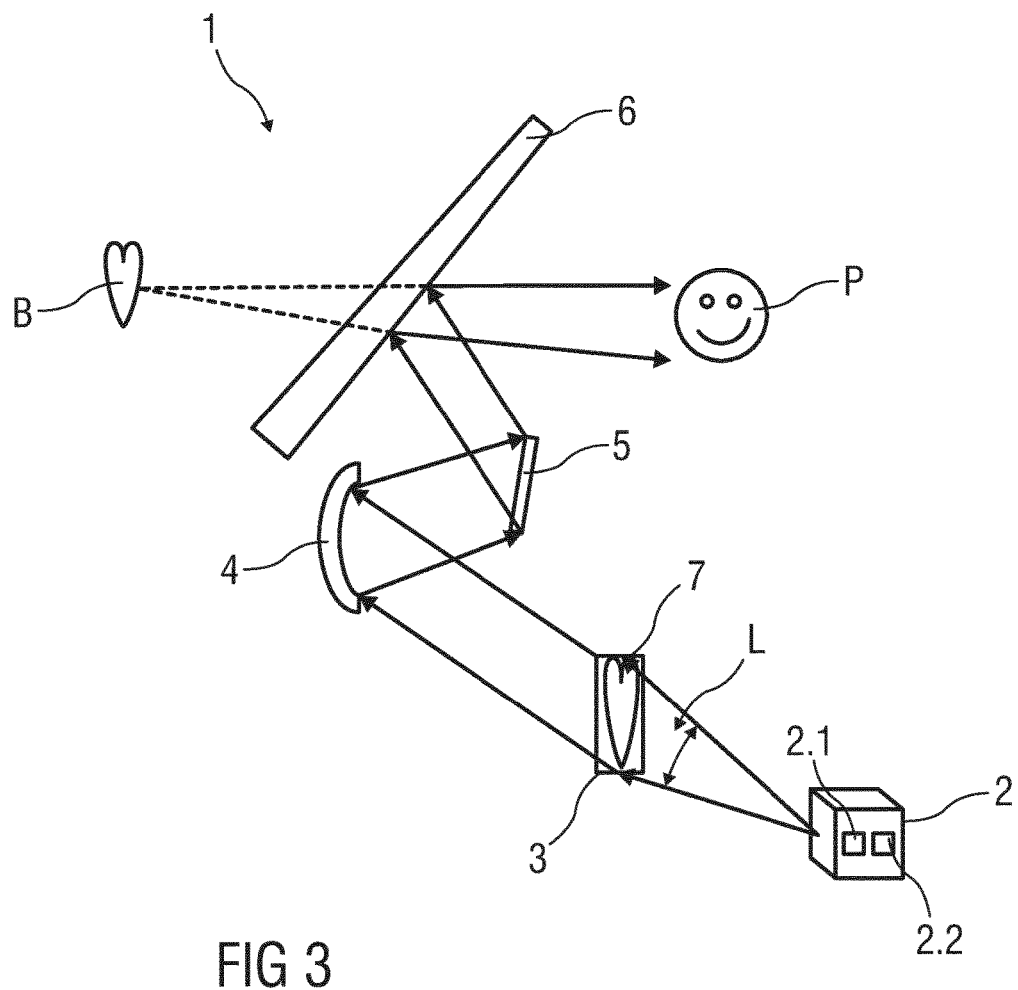
Figure 4:
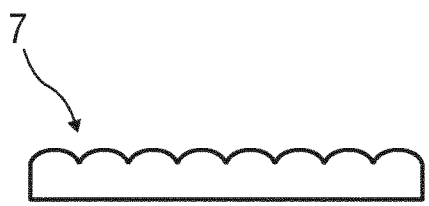
Figure 5:
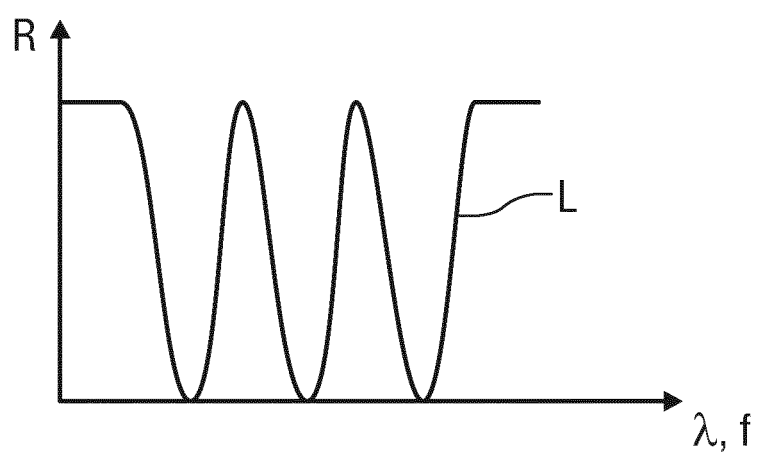

In the figures in this case,

FIG. 1 schematically shows a first exemplary embodiment of a head-up display according to the invention comprising an intermediate screen wherein the intermediate screen is embodied in an at least partly reflective fashion, FIG. 2 schematically shows a reflection behavior of the intermediate screen in accordance with FIG. 1 with regard to light generated by means of a light source of the head-up display as a function of a frequency or wavelength of the light, FIG. 3 schematically shows a second exemplary embodiment of a head-up display according to the invention comprising an intermediate screen, wherein the intermediate screen is embodied in a transparent fashion, FIG. 4 schematically shows a transmission behavior of the intermediate screen in accordance with FIG. 3 with regard to light generated by means of a light source of the head-up display as a function of a frequency or wavelength of the light, and FIG. 5 schematically shows a reflection behavior of the intermediate screen in accordance with FIG. 3 with regard to the light generated by means of the light source of the head-up display as a function of a frequency and a wavelength of the light.

Mutually corresponding parts are provided with the same reference signs in all of the figures.

FIG. 1 schematically illustrates a first exemplary embodiment of a head-up display 1 according to the invention.

The head-up display 1 comprises an imaging unit 2, which comprises a light source 2.1 and at least one so-called microsystem 2.2, designated as micro-electro-mechanical system (for short: MEMS).

Light L having the colors red, green and blue is generated by means of the light source 2.1, which is a laser, for example.

In the case of a head-up display known from the prior art, said light is guided, in a manner not illustrated, through an intermediate screen embodied in a transparent fashion, which intermediate screen orients and shapes the light in such a way that an image to be represented arises on a projection screen. What is disadvantageous here is that ambient light present leads to a backlighting of the intermediate screen, thus resulting in a reduction of the contrast of the image to be represented. This has the consequence in turn of reducing an impression of the effect of a realistic representation in the case of a superimposing representation of the visible surroundings by means of the image.

In order to overcome these disadvantages, an intermediate screen 3 in the illustrated exemplary embodiment of the head-up display 1 according to the invention is embodied in such a way as to minimize the backlighting of the image B to be represented, which backlighting results from ambient light.

For this purpose, the intermediate screen 3 is embodied in a reflective fashion. Consequently, a backlighting of the image B with ambient light is avoided, thus resulting in a high contrast of the image B.

The oriented light L is reflected by means of the intermediate screen 3 onto a mirror 4 embodied in a concave fashion and adjustable in terms of its inclination, from which mirror the light L is reflected onto a further mirror 5.

The virtual image B is output to an observer P, for example a driver of a vehicle, by reflection of the light L by means of the mirror 5 onto a projection screen 6.

The projection screen 6 is embodied for example as a separate screen and is arranged in the region between a dashboard of the vehicle and a windshield. Moreover, it is possible for at least one section of the windshield, the so-called combiner to form the projection screen 6.

For further reduction of an influence of the ambient light on the virtual image B, in one development (not illustrated in more specific detail) the intermediate screen 3 additionally comprises an optical filter embodied in such a way that only the light L generated by the light source 2.1 is reflected from the intermediate screen 3 in the direction of the mirror 4, whereas ambient light is absorbed, transmitted or reflected in a different direction than to the mirror 4.

The optical filter is formed from a photoactive and/or photorefractive material, for example a polymer. For selective reflection, absorption, transmission and/or reflection, a holographic structure is preferably introduced into said material. This introduction is effected, for example, by means of one or a plurality of laser beams, such that, by means of the intermediate screen 3, an amplitude and/or phase modulation of the light L impinging on said intermediate screen and of the ambient light is carried out and the ambient light is filtered out. In this case, the filtering is carried out depending on the wavelength and/or the angle of incidence of the impinging light L and ambient light.

FIG. 2 schematically shows a reflection behavior R of the intermediate screen 3 in accordance with FIG. 1 with regard to the light L generated by means of the light source 2.1 of the head-up display 1 as a function of a frequency f and a wavelength $\lambda$ of the light L. The illustration makes it clear that only the light L generated by the light source 2.1 is reflected.

FIG. 3 schematically illustrates a second exemplary embodiment of the head-up display 1 according to the invention. In contrast to the exemplary embodiment illustrated in FIG. 1, the intermediate screen 3 is embodied in a partly transparent fashion and arranged in such a way that it is transluminated by the emitted light L, orients said light in a defined manner and forwards it to the mirror 4.

The intermediate screen 3 is furthermore likewise embodied in such a way as to minimize the backlighting of the image B to represented, which backlighting results from ambient light. For this purpose, the intermediate screen 3 comprises an optical filter 7, wherein only the light L generated by the light source 2.1 is transmitted by the filter 7. Ambient light is reflected, absorbed or deflected in a different direction than to the mirror 4.

The optical filter 7, which is illustrated schematically in FIG. 4, is formed from a photoactive and/or photorefractive material, for example a polymer. For selective reflection, absorption, transmission and/or reflection, a holographic structure is preferably introduced into said material. This introduction is effected, for example, by means of one or a plurality of laser beams, such that, by means of the intermediate screen 3, an amplitude and/or phase modulation of the light L impinging on said intermediate screen and of the ambient light is carried out and the ambient light is filtered out. In this case, the filtering is carried out depending on the wavelength $\lambda$ and/or the angle of incidence of the impinging light L and ambient light.

FIG. 5 schematically illustrates a reflection behavior R of the intermediate screen 3 in accordance with FIG. 3 with regard to the light L generated by means of the light source 2.1 of the head-up display 1 as a function of a frequency f and a wavelength $\lambda$ of the light L. The illustration makes it clear that only the light L generated by the light source 2.1 is transmitted in the direction of the mirror 4.

In an alternative exemplary embodiment (not illustrated) or in addition to the described properties of the head-up display 1 in accordance with the first or second exemplary embodiment, provision is made for the projection screen 6 to comprise an optical filter in accordance with the description of the first exemplary embodiment, such that only the light L generated by the light source 2.1 is reflected from the projection screen 6 in the direction of the observer.

LIST OF REFERENCE SIGNS

1 Head-up display
2 Imaging unit
2.1 Light source
2.2 Microsystem
3 Intermediate screen
4 Mirror 5 Mirror
6 Projection screen
7 Filter
B Image
L Light
f Frequency
P Observer
R Reflection behavior
Λ Wavelength

The invention claimed is:

1. A head-up display comprising:
a light source operable to emit light;
a projection screen operable to direct light emitted from the light source in a direction toward an observer;
an intermediate screen for the orientation of light emitted by the light source along an optical path to the projection screen;
the intermediate screen located between the light source and the projection screen along the optical path, and, resulting therefrom, for the shaping of an image to be represented on the projection screen;
at least one mirror located between the intermediate screen and the projection screen along the optical path;
wherein the intermediate screen comprises an optical filter;
wherein the optical filter is configured to filter out ambient light by exclusively directing the light emitted by the light source in a direction toward the at least one mirror, wherein the at least one mirror further reflects the light emitted by the light source to the projection screen, and wherein the optical filter is configured to reflect or deflect ambient light in a direction different than the direction toward the at least one mirror;
wherein the optical filter is operable to filter out the ambient light by an amplitude and/or phase modulation of the light emitted by the light source and of the ambient light, and depending on the wavelength of the light emitted by the light source and the ambient light; and
wherein the optical filter is made of at least one of a photoactive or photorefractive material; and
wherein a holographic structure is introduced into the at least one of the photoactive or the photorefractive material.

2. The head-up display as claimed in claim 1, wherein the intermediate screen is fully reflective.

3. The head-up display as claimed in claim 1, wherein the optical filter is configured such that exclusively the light generated by the light source is reflectable from the intermediate screen.

4. The head-up display as claimed in claim 1, wherein the optical filter is configured such that exclusively the light generated by the light source is transmittable by the intermediate screen.

5. The head-up display as claimed in claim 1, wherein the projection screen comprises an optical filter configured such that exclusively the light generated by the light source is reflectable from the projection screen in the direction of the observer and ambient light is absorbable, transmittable or reflectable in a predefined direction different than the direction from the projection screen toward the observer.

6. A head-up display comprising:
a light source operable to emit light;
a projection screen operable to direct light emitted from the light source in a direction toward an observer;
an intermediate screen for the orientation of light emitted by the light source along an optical path to the projection screen, wherein the intermediate screen is located between the light source and the projection screen along the optical path;
at least one mirror located between the intermediate screen and the projection screen along the optical path, and configured to reflect light received from the intermediate screen onto the projection screen; and
wherein the intermediate screen comprises an optical filter configured to filter out ambient light by directing the light emitted by the light source in a direction toward the at least one mirror, and reflect or deflect ambient light in a direction different than the direction toward the at least one mirror.

* * * * *